(12) United States Patent
Ide et al.

(10) Patent No.: US 12,014,863 B2
(45) Date of Patent: Jun. 18, 2024

(54) COIL-FORMING APPARATUS

(71) Applicant: HONDA MOTOR CO., LTD., Tokyo (JP)

(72) Inventors: Takahiro Ide, Tochigi (JP); Kenichi Omagari, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 822 days.

(21) Appl. No.: 17/101,296

(22) Filed: Nov. 23, 2020

(65) Prior Publication Data

US 2021/0202155 A1    Jul. 1, 2021

(30) Foreign Application Priority Data

Dec. 27, 2019 (JP) .................................. 2019-238486

(51) Int. Cl.
*H01F 27/28* (2006.01)
*H01F 17/04* (2006.01)
*H01F 41/082* (2016.01)

(52) U.S. Cl.
CPC ....... *H01F 27/2823* (2013.01); *H01F 17/045* (2013.01); *H01F 41/082* (2016.01)

(58) Field of Classification Search
CPC .. H01F 27/2823; H01F 41/082; H01F 41/077; H01F 41/071; H02K 15/0421; H02K 15/04

See application file for complete search history.

(56) References Cited

U.S. PATENT DOCUMENTS

| | | | | |
|---|---|---|---|---|
| 7,480,987 | B1* | 1/2009 | Guercioni | H02K 15/0421 29/874 |
| 11,190,089 | B2* | 11/2021 | Kim | H02K 15/0421 |
| 2015/0302988 | A1* | 10/2015 | Shirai | H02K 15/045 72/142 |
| 2017/0353091 | A1* | 12/2017 | Genmoto | H02K 15/0421 |
| 2019/0109524 | A1* | 4/2019 | Watanabe | H02K 15/04 |
| 2019/0190359 | A1* | 6/2019 | Miyawaki | H02K 3/04 |
| 2020/0274426 | A1* | 8/2020 | Iwamoto | H02K 15/064 |

FOREIGN PATENT DOCUMENTS

JP  2007-227226  9/2007
WO  WO-2019097865 A1 * 5/2019 ......... H02K 15/0421

* cited by examiner

*Primary Examiner* — Jeffrey T Carley
*Assistant Examiner* — Jose K Abraham
(74) *Attorney, Agent, or Firm* — Rankin, Hill & Clark LLP

(57) ABSTRACT

A coil-forming apparatus for forming a bare coil wire into a U-shape, the apparatus including: one bare coil-wire holding unit that winds and holds a bare coil wire; a take-up drum that includes one or a plurality of housing units that house the bare coil wire supplied from the one bare coil wire holding unit at a circumference; a cutting member that cuts the bare coil wire housed in housing units and wound around the take-up drum, at a portion of the circumference of the take-up drum; a drawing member for drawing the bare coil wire outward in a radial direction of the take-up drum after being cut by the cutting member, from a position separated from the cutting member; and a forming unit that forms the bare coil wire drawn by the drawing member into a U-shape.

10 Claims, 16 Drawing Sheets

COIL-FORMING APPARATUS

This application is based on and claims the benefit of priority from Japanese Patent Application No. 2019-238486, filed on 27 Dec. 2019, the content of which is incorporated herein by reference.

BACKGROUND OF THE INVENTION

Field of the Invention

The present invention relates to a coil-forming apparatus.

Related Art

Generally, a coil that constitutes a stator in a rotary electric machine, such as an electric motor, or a generator, or the like, is obtained by forming bare coil wire, which is unwound from a bobbin and cut to a predetermined length, into a predetermined shape. For example, in a case of a corrugated coil, after forming a U-shaped body by forming a predetermined length of bare coil wire into the U-shaped body, the U-shaped body is folded a plurality of times.

The coil is sometimes constituted by using a collective conductor that bundles a plurality of coil wires into one. A method of forming a collective conductor is known that individually winds out bare coil wire from the number of unwinding rollers (bobbins) corresponding to the number of bare coil wires that constitute the collective conductor, and then winds the bare coil wire into a single take-up roller (for example, see Patent Document 1).

Patent Document 1: Japanese Unexamined Patent Application, Publication No. 2007-227266

SUMMARY OF THE INVENTION

However, in a case where the collective conductor is formed by winding a plurality of bare coil wires out of individual bobbins respectively, there is a problem in that the forming accuracy of the collective conductor is poor. This is because each coil wire has a different winding tendency. Moreover, in a case to form a U-shape body, it is necessary to rewind the collective conductor from the take-up roller around which the collective conductor is wound and to cut that into predetermined lengths, and then form the U-shape. For that reason, there is a problem in that the forming process is complex. The winding tendencies of bare coil wires and the complexity of this type of forming processes are problems that are also found in a case of forming a plurality of U-shaped bodies having the same shape using a single bare coil wire.

An object of the present invention is to provide a coil-forming apparatus that easily forms into a U-shape using a bare coil wire without a deterioration in forming accuracy caused by a winding tendency.

(1) The coil forming apparatus according to the present invention is a coil-forming apparatus (e.g., a coil-forming apparatus 1 described below) that forms a bare coil wire (e.g., bare coil wire 10 described below) into a U-shape, and includes: one bare coil-wire holding unit (e.g., bobbin 2 described below) that winds and holds the bare coil wire; a take-up drum (e.g., take-up drum 4 described below) having one or a plurality of housing units (e.g., a first housing unit 451 described below, a second housing unit 462 described below) that houses the bare coil wire supplied from the one bare coil-wire holding unit, on an outer circumference (e.g., an outer circumference 4*a* described below); a cutting member (e.g., a cutting member 5 described below) that cuts the bare coil wire housed in the housing unit and wound around the take-up drum, at a portion of the outer circumference of the take-up drum; a drawing member (e.g., a drawing member 6 described below) that draws the bare coil wire outward in a radial direction of the take-up drum after being cut by the cutting member from a position separated from the cutting member; and a forming unit (e.g., a forming unit 7 described below) that forms the bare coil wire pulled by the drawing member into a U-shape.

According to (1) above, the bare coil wire is supplied from the one bare coil wire-holding unit and wound around a take-up drum, and therefore is formed into a U-shape without a deterioration in forming precision caused by a winding tendency. Moreover, after winding and cutting the bare coil wire at the outer circumference of the take-up drum, the bare coil wire can easily be formed into a U-shape by being simply pulled out in the radial direction of the take-up drum.

(2) In the coil forming apparatus according to (1), the housing unit may be disposed in a plurality in an axial direction of the take-up drum (for example, in a Z direction described below).

According to (2) above, it is possible to form a plurality of bare coil wires together into a U-shape by winding the bare coil wire across the plurality of housing units, and forming the plurality of bare coil wire after cutting.

(3) In the coil-forming apparatus according to (1) or (2), the housing unit may have a size capable of housing the bare coil wire by layering a plurality of winds around the take-up drum.

According to (3) above, a collective conductor composed of a plurality of bare coil wires can also be formed by simply winding the bare coil wires around the outer circumference of the take-up drum.

(4) In the coil-forming apparatus according to any one of (1) to (3), the forming unit includes a drawing passage unit (e.g., a drawing passage unit 71 described below) that extends outward in a radial direction from the take-up drum to constitute a passage for the bare coil wire drawn by the drawing member, and the drawing passage unit may include a pair of guide members (e.g., a guide member 711 described below) that guides the bare coil wire drawn by the drawing member from the take-up drum as sandwiched from both sides so that the bare coil wire does not spread.

According to (4) above, when drawing the bare coil wire, the bare coil wire can be smoothly drawn to the forming unit without spreading from the outer circumference of the take-up drum.

(5) In the coil-forming apparatus according to any one of (1) to (4), the drawing member is constituted to draw the bare coil wire from the inside to the outside in the radial direction of the take-up drum after the wire is cut by the cutting member, and the forming unit has a die (e.g., die 72 described below) that forms the bare coil wire into a U-shape near the end in the drawing direction by the drawing member, and the drawing member may constitute a portion of the die.

According to (5) above, the drawing member for drawing the bare coil wire from the outer circumference of the take-up drum can be used as-is to form the bare-coil wire into a U-shape using the die, and therefore, there is no need to transfer the bare-coil wire from the drawing member, and the drawing of the bare-coil wire to the forming of the bare coil wire can be implemented in one process.

(6) In the coil-forming apparatus according to any one of (1) to (5), the take-up drum may be constituted to wind the bare coil wire around the outer circumference by rotating about a rotating shaft (e.g., a rotating shaft 41 described below).

According to (6) above, the bare coil wire can easily be wound around the outer circumference of the take-up drum simply by rotating the take-up drum.

According to the present invention, it is possible to provide a coil-forming apparatus that easily forms bare coil wire into a U-shape without a deterioration in forming accuracy caused by a winding tendency.

DETAILED DESCRIPTION OF THE INVENTION

Figure 1:
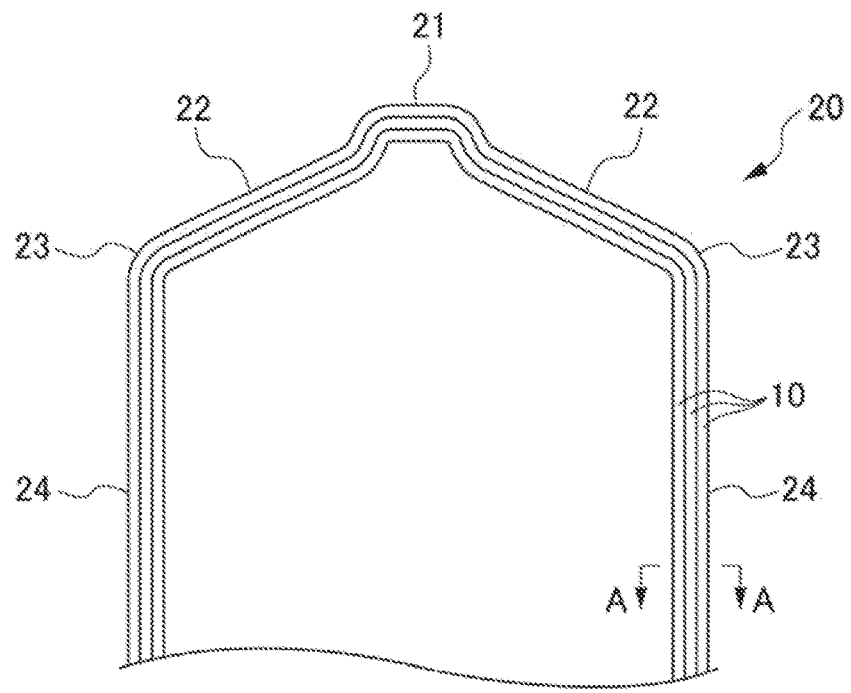
FIG. 1 is a front view of a U-shaped coil formed by a coil-forming apparatus.

Embodiments of a coil-forming apparatus will now be described in detail with reference to the drawings. Firstly, coil formed using a coil-forming apparatus disclosed in the present disclosure will be described with reference to FIGS. 1 to 3. A coil-forming apparatus 1 forms a U-shaped coil 20 by bending a bare coil wire 10 into a U-shape. The U-shaped coil 20 has an apex 21 at a leading end, a pair of oblique portions 22, 22 that extend obliquely from the apex 21, a pair of shoulders 23, 23 that bend at each end portion of the oblique portions 22, 22, and a pair of straight portions 24, 24 that extend in parallel from the shoulders 23, 23.

Figure 2:
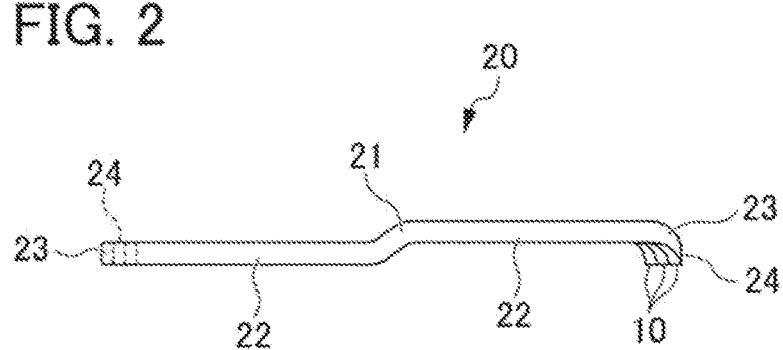
FIG. 2 is a plan view of a U-shaped coil formed by a coil molding apparatus.
Figure 3:
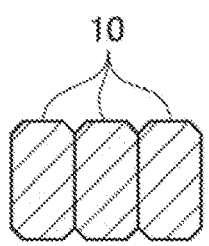
FIG. 3 is a sectional view taken along arrows A-A in FIG. 1.

As shown in FIG. 2, a right-side oblique portion 22 of the pair of oblique portions 22, 22 on the U-shaped coil 20 is offset by only a thickness of the U-shaped coil 20 in a thickness direction of the U-shaped coil 20 (in up and down directions in FIG. 2) relative to a left-side oblique portion 22 and the straight portions 24, 24. That is, only the right-side oblique portion 22 is offset in the thickness direction, since the apex 21 and the right-side shoulder portion 23 on the U-shaped coil 20 are formed into a crank shape in the thickness direction.

The U-shaped coil 20 shown in the present embodiment is a collective conductor layered with a plurality (three in the present embodiment) of bare coil wires 10 composed of a rectangular wire constituted by conductors such as copper and aluminum. The three bare coil wires 10 are layered in a width direction (left and right directions in FIG. 1) of the U-shaped coil 20.

Figure 4:
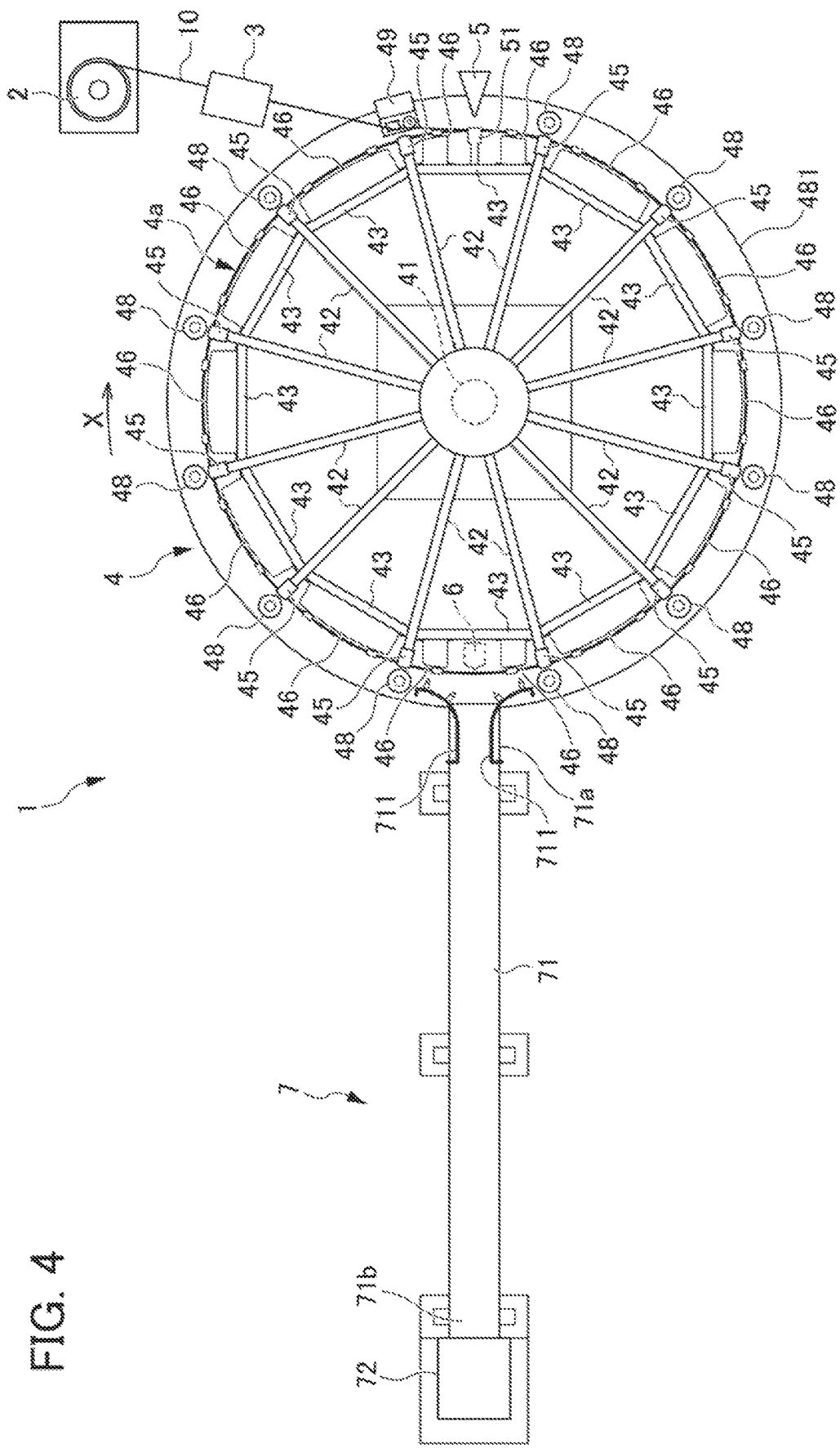
FIG. 4 is a plan view of one embodiment of a coil-forming apparatus.
Figure 5:
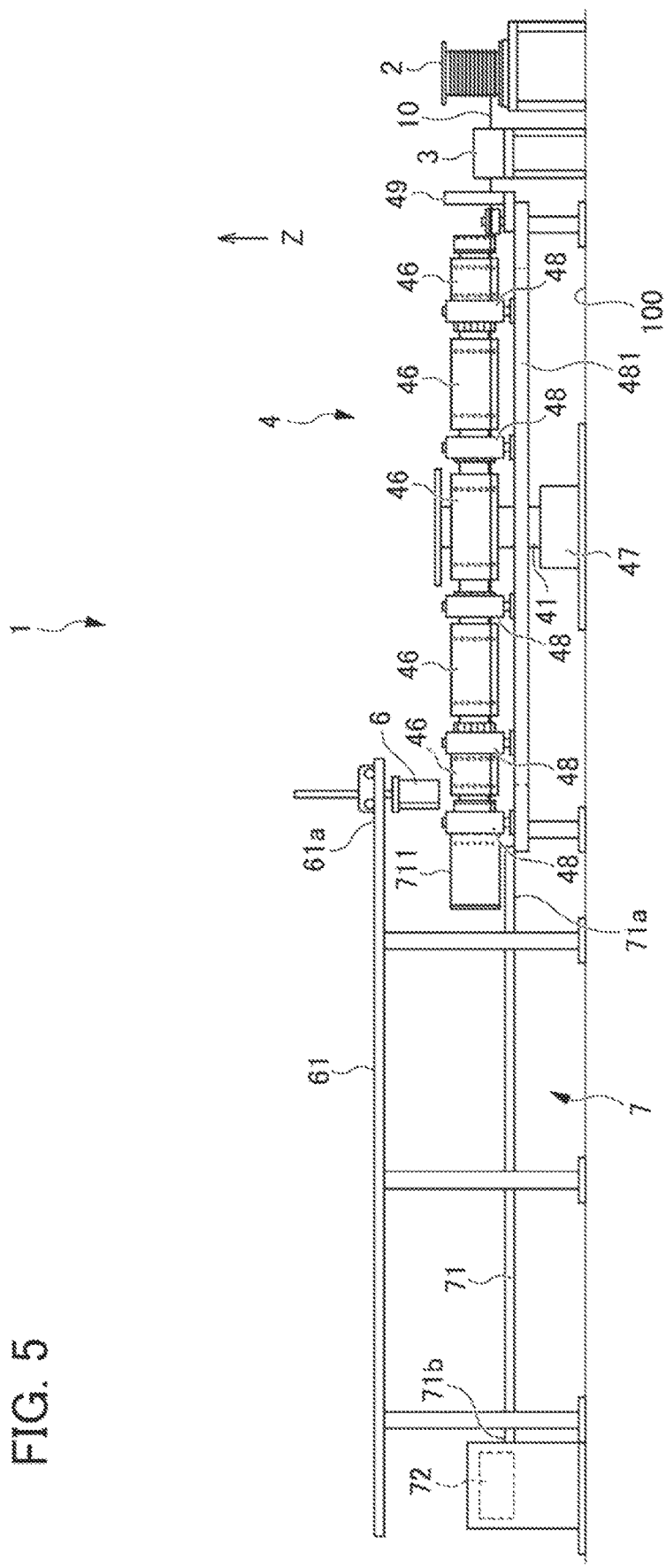
FIG. 5 is a side view of one embodiment of a coil-forming apparatus.

As shown in FIGS. 4 and 5, the coil-forming apparatus 1 is equipped with a bobbin 2 that supplies the bare coil wire 10, a straightening unit 3 that straightens a winding tendency associated with the bare coil wire 10 supplied from the bobbin 2, a take-up drum 4 that winds the bare coil wire 10, a cutting member 5 that cuts the bare coil wire 10 wound around the take-up drum 4, a drawing member 6 for drawing the bare coil wire 10 radially outward from the take-up drum 4, and a forming unit 7 that forms the bare coil wire 10 into a U-shape. Note that in FIG. 5, the cutting member 5 is omitted from the drawing.

The bobbin 2 is a bare coil wire-holding unit that winds and holds the bare coil wire 10. In the coil-forming apparatus 1, only one bobbin 2 is disposed. The bare coil wire 10 is unwound from this single bobbin 2 and supplied to the take-up drum 4.

Figure 6:
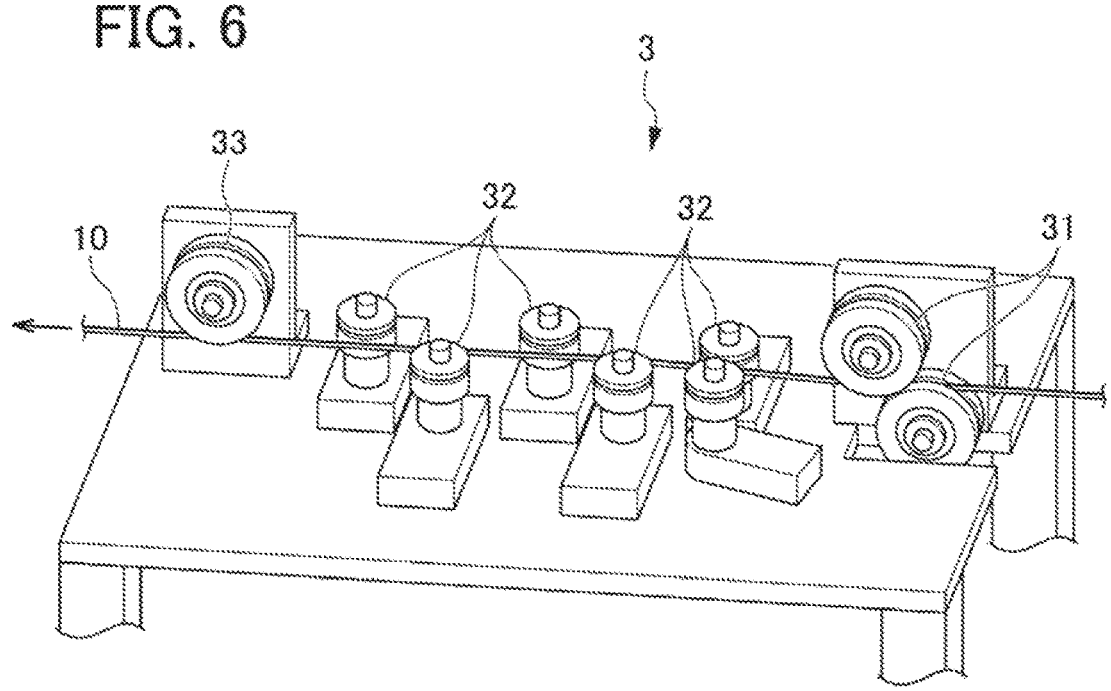
FIG. 6 is a perspective view of a bare coil-wire straightening unit.

The straightening unit 3 is arranged on a supply path of the bare coil wire 10 from the bobbin 2 toward the take-up drum 4 to straighten a winding tendency of the bare coil wire 10 wound around the bobbin 2. As shown in FIG. 6, the straightening unit 3 includes a pair of introduction rollers 31, 31 that introduce the bare coil wire 10, a plurality of straightening rollers 32, and a feed roller 33 that feeds the bare coil wire 10 via the plurality of straightening rollers 32 toward the take-up drum 4. The plurality of straightening rollers 32 apply tension to the bare coil wire 10 from the same direction as the radial direction of the bobbin 2 to straighten winding tendencies of the bare coil wire 10.

The take-up drum 4 includes a rotating shaft 41 arranged in a perpendicular direction (a Z direction) to a floor surface 100, twelve evenly spaced radial frame units 42 extending radially from a circumference of the rotating shaft 41, and twelve linking frame units 43 connecting the leading ends of adjacent radial frame units 42, 42.

A first outer circumferential member 45 is attached to each leading end of the twelve radial frame units 42. The first outer circumferential member 45 is composed of a metal block that is axially longer (Z direction) than a circumferential direction (X direction) of the take-up drum 4 and constitutes a portion of an outer circumference 4a of the take-up drum 4 to wind the bare coil wire 10.

Figure 7:
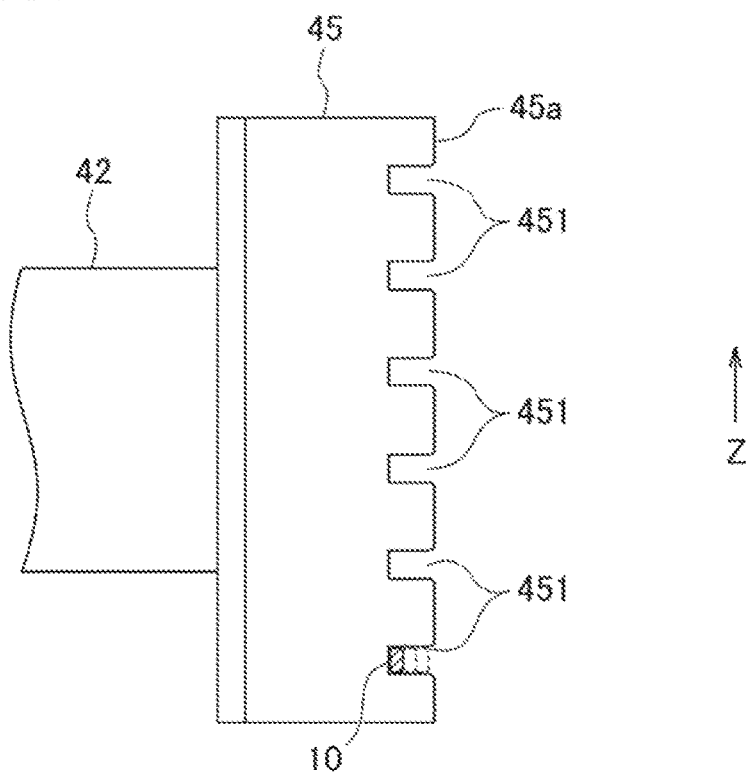
FIG. 7 is a side view of a first outer circumferential member on a take-up drum.

As shown in FIG. 7, first housing units 451 for housing the bare coil wire 10 are disposed on a leading-edge surface 45a that faces a radial outer side of the take-up drum 4 on the first outer circumferential member 45. Six first housing units 451 are arranged in the first outer circumferential member 45 in the present embodiment, at regular intervals along an axial direction of the take-up drum 4. The six first housing units 451 have the same structure and are each constituted with grooves extending along a circumferential direction of the take-up drum 4. The bare coil wire 10 supplied from the bobbin 2 is wound around the outer circumference 4a of the take-up drum 4 via the straightening unit 3 by being housed inside the first housing units 451 on the twelve first outer circumferential members 45.

FIG. 7 shows an aspect, in which a first wind of the bare coil wire 10 wound around the take-up drum 4 is housed in a lowermost first housing unit 451, depicted as a solid line. As depicted by dashed lines in FIG. 7, each of the first housing unit 451 in the present embodiment is of a size (depth) that can house three winds of the bare coil wire 10 around the take-up drum 4 by layering in a radial direction of the take-up drum 4. Therefore, the take-up drum 4 in the present embodiment is capable of winding eighteen winds of the bare coil wires 10 around the outer circumferential 4a.

Figure 8:
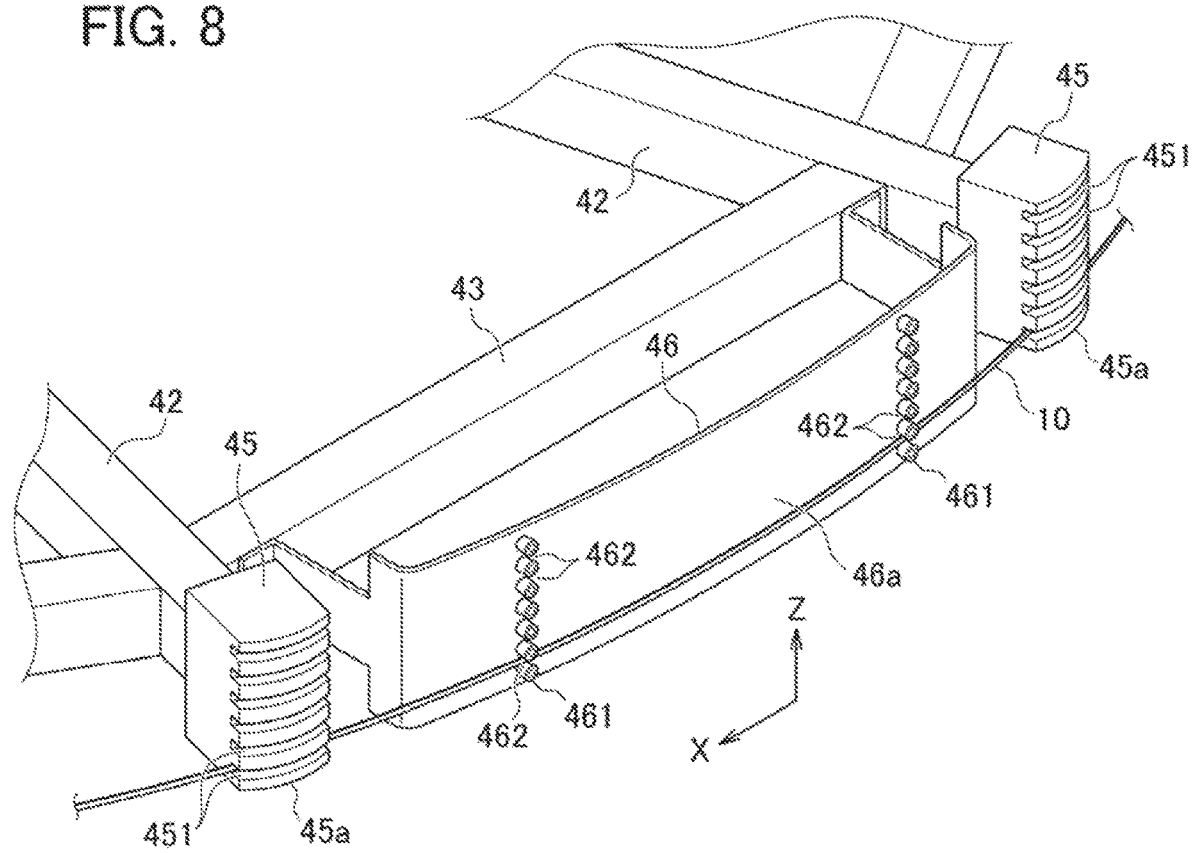
FIG. 8 is a perspective view of a second outer circumferential member on the take-up drum.
Figure 9:
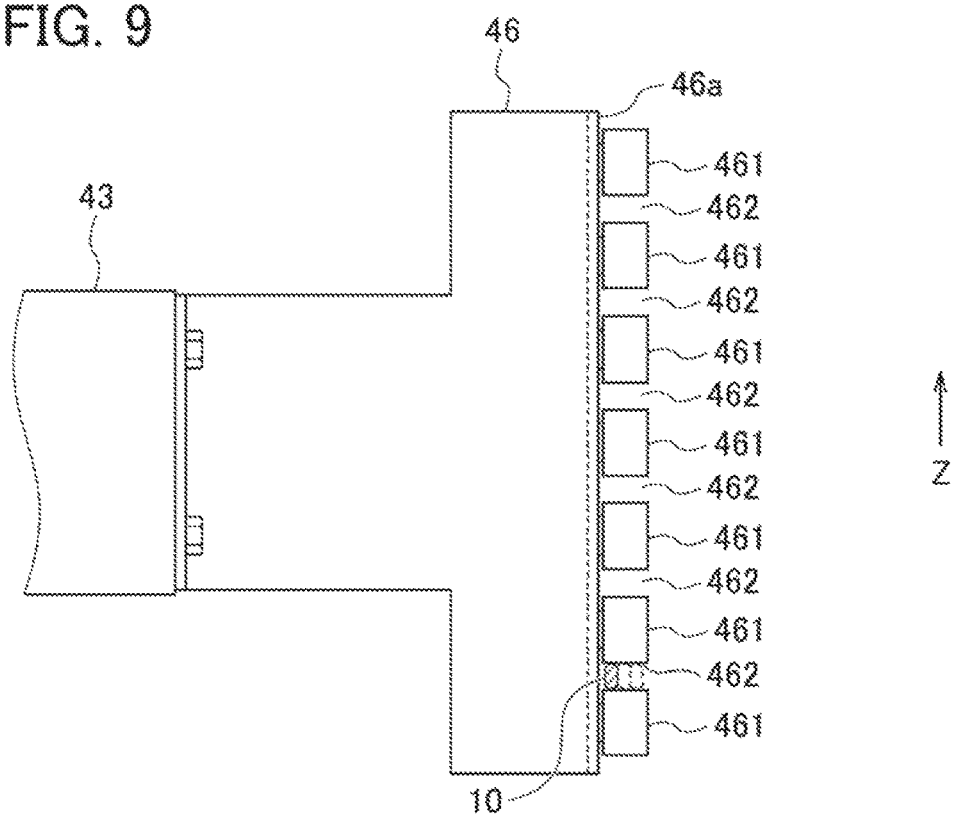
FIG. 9 is a side view of the second outer circumferential member on the take-up drum.

A second outer circumferential member 46 is attached to each of the twelve linked frame units 43 arranged between the adjacent radial frame units 42, 42. As shown in FIGS. 8 and 9, the second outer circumferential member 46 is formed by a metal sheet having a height that is substantially equal to a height (a height along a Z direction) of the first outer circumferential member 45. The second outer circumferential member 46 constitutes a portion of the outer circumference 4a of the take-up drum 4 for winding the bare coil wire 10, along with the first outer circumferential member 45.

The second outer circumferential member 46 is attached to the linked frame unit 43 so as to project radially outward from the take-up drum 4 to constitute substantially the same surface as the leading-edge surface 45a of the first outer circumferential member 45 at the outer circumference 4a of the take-up drum 4. A leading-edge surface 46a of the second outer circumferential member 46 that faces the outside in a radial direction of the take-up drum 4 is curved along an arc shape of the outer circumference 4a of the take-up drum 4.

Seven columnar or cylindrical roller members 461 are mounted to the leading-edge surface 46a on the second outer circumferential member 46 at regular intervals along an axial direction of the take-up drum 4. The axial direction of each roller member 461 is along the radial direction of the take-up drum 4. As a result, each of the six second housing units 462 for housing the bare coil wire 10 is formed between the roller members 461, 461 axially adjacent to the take-up drum 4. The positions of the six first housing units 451 on the first circumferential member 45 along the axial direction of the take-up drum 4 and the positions of the six second housing units 462 are the same. For that reason, the bare coil wire 10 wound around the outer circumference 4a of the take-up drum 4 is housed over the first housing unit 451 on the first outer circumferential member 45 and the second housing unit 462 on the second outer circumferential member 46.

FIG. 9 shows an aspect, in which a first wind of the bare coil wire 10 wound around the take-up drum 4 is housed in a lowermost second housing unit 462, depicted as a solid line. As indicated by dashed lines in FIG. 9, each of the second housing unit 462 in the present embodiment is of a size (a projection height of the roller members 461) that can house three winds of the bare coil wire 10 around the take-up drum 4 by layering in the radial direction of the take-up drum 4.

The second outer circumferential member 46 shown in FIG. 8 is formed lengthwise on a circumference of the take-up drum 4. The long second outer circumferential member 46 has two sets of seven roller members 461 disposed with only one arranged between adjacent first outer circumferential members 45, 45 and arranged in an axial direction of the take-up drum 4. One set of two roller members 461 is arranged at an interval in a circumference direction of the take-up drum 4. However, the number of sets of roller members 461 disposed on one second outer circumferential member 46 can be increased or decreased as appropriate according to a length of the second outer circumferential member 46. For example, on the take-up drum 4 depicted in FIG. 4, two short-length second outer circumferential members 46, 46 are disposed between adjacent first outer circumferential members 45, 45 at the position where the cutting member 5 and the drawing member 6 are disposed. It is acceptable that this type of short, second outer circumferential member 46 has only one set of roller members 461.

The take-up drum 4 is rotatable in a clockwise direction in FIG. 4 around the rotating shaft 41 by a drive from a drive motor 47 that is coupled to the rotating shaft 41. The take-up drum 4 is constituted to rotate to automatically wind the bare coil wire 10 supplied from the bobbin 2 via the straightening unit 3.

A plurality of holding rollers 48 are arranged radially outward on the take-up drum 4 at regular intervals in a circumferential direction of the take-up drum 4. The holding rollers 48 are rotatably disposed on a ring-shaped support base 481 arranged radially outward on the take-up drum 4 to touch the outer circumference 4a of the take-up drum 4. For that reason, when the take-up drum 4 is rotated, the leading-edge surface 45a of the first outer circumferential member 45 and the holding rollers 48 move relative to each other while in contact, preventing the bare coil wire 10 from falling off the first housing unit 451 and the second housing unit 462.

Figure 10:
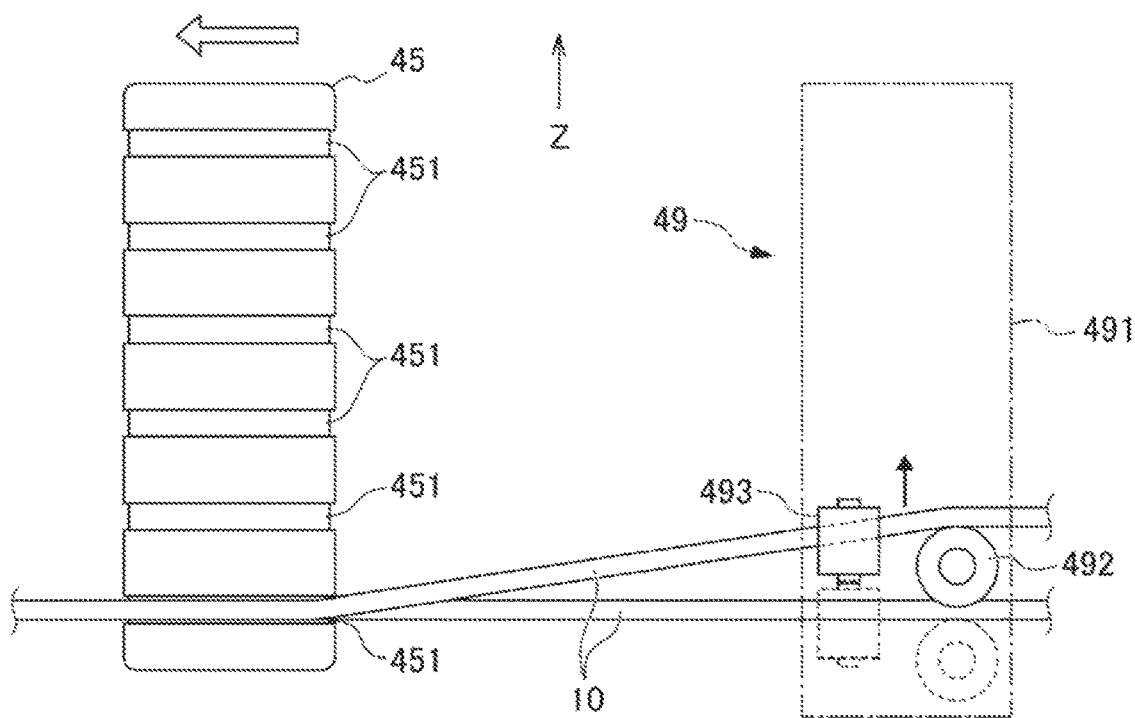
FIG. 10 is a view for explaining a bare coil-wire introduction unit.

As shown in FIG. 4, a bare coil-wire guide member 49 that introduces the bare coil wire 10 to the take-up drum 4 is disposed on the support base 481, corresponding to a position where the bare coil wire 10 from the bobbin 2 touches the outer circumference 4a of the take-up drum 4 passing through the straightening unit 3. As shown in FIG. 10, the bare coil-wire guide member 49 is equipped with a first support roller 492 that supports by touching the bare coil wire 10 from below, and a second support roller 493 that supports by touching the bare coil wire 10 radially from an outside of the take-up drum 4, on a substrate portion 491 that extends in a radial direction of the take-up drum 4. With this, the bare coil wire 10 supplied from the bobbin 2 via the straightening unit 3 is supported by touching in order of the first support roller 492 and the second support roller 493 and is smoothly introduced to the outer circumference 4a of the take-up drum 4.

The first support roller 492 and the second support roller 493 in the bare coil-wire guide member 49 are disposed to movable upward and downward relative to the substrate portion 491 by a drive from a motor or the like (not shown). The bare coil-wire guide member 49 operates to raise the first support roller 492 and the second support roller 493 in synchronization with a rotation of the take-up drum 4. Specifically, the first housing unit 451 for the first outer circumferential member 45 and the second housing unit 462 for the second outer circumferential member 46 shown in the present embodiment each houses three winds of the bare coil wire 10, so that the bare coil-wire guide member 49 raises the first support roller 492 and the second support roller 493 by a fixed distance each time the take-up drum 4 rotates three times. This fixed distance corresponds to a spacing between the two first housing units 451, 451 axially adjacent to the take-up drum 4 at the first outer circumferential member 45. As a result, the bare coil wire 10 wound around the take-up drum 4 automatically moves to a height corresponding to the first housing unit 451 and the second housing unit 462 one above for every three winds around the take-up drum 4 (each time the take-up drum 4 rotates three times).

The diameter of the take-up drum 4 can be set as appropriate according to a length of U-shaped coil 20 to be formed. For example, if a length of the U-shaped coil 20 is approximately 6 m (a length of the U-shaped coil 20 extended straight is approximately 12 m), the diameter of the take-up drum 4 is set to about 4 m. However, it is desirable that the diameter of the take-up drum 4 is set to a diameter that does not exceed an elastic range of the bare coil wire 10. According to this, when the bare coil wire 10 is wound around the take-up drum 4, winding tendencies do not easily occur with the bare coil wire 10.

The cutting member 5 is composed of a wire cutter, for example, capable of cutting the bare coil wire 10, and is arranged near the bare coil-wire guide member 49 at a side in a radial direction of the take-up drum 4, as shown in FIG. 4. After finishing the winding of the bare coil wire 10 around the outer circumference 4a of the take-up drum 4, the cutting member 5 cuts the bare coil wire 10 at a portion of that outer circumference 4a.

A planar shape of the drawing member 6 has a convex shape toward an outside in a radial direction of the take-up drum 4, along an inner surface shape of the U-shaped coil 20 shown in FIG. 1. A height of the drawing member 6 along an axial direction of the take-up drum 4 is substantially equal to a height of the first outer circumferential member 45 and is configured to allow all bare coil wire 10 wound around the take-up drum 4 to be drawn from the take-up drum 4.

The drawing member 6 is arranged above the take-up drum 4. The drawing member 6 is arranged to movable upward and downward by a drive such as a motor or the like (not shown) and linearly in one direction along a radial direction of the take-up drum 4. More specifically, as shown in FIG. 5, a guide rail 61 is disposed that extends linearly from above the take-up drum 4 at a position furthest from the cutting member 5 by sandwiching the take-up drum 4 toward an outside in a radial direction of the take-up drum 4. The guide rail 61 is arranged parallel to the floor surface 100 at a position higher than the take-up drum 4.

The drawing member 6 before the drawing operation is arranged at a lower side of an end portion 61a at a side near the take-up drum 4 on the guide rail 61. This position is further inside than the bare coil wire 10 wound around the outer circumference 4a of take-up drum 4. Therefore, when the drawing member 6 is lowered, the drawing member 6 is arranged at an inside of the bare coil wire 10 wound around the take-up drum 4. By moving along the guide rail 61 from this position, the drawing member 6 pulls the bare coil wire 10 after being cut by the cutting member 5 toward the outside in a radial direction of the take-up drum 4.

The forming unit 7 is arranged below the guide rail 61. More specifically, as shown in FIGS. 4 and 5, the forming unit 7 has a drawing passage unit 71 that constitutes a passage for the bare coil wire 10 drawn from the take-up drum 4 by the drawing member 6, and a die 72 that forms the drawn bare coil wire 10 into a U-shape.

The drawing passage portion 71 is formed into a long, tray shape that extends radially outward from the outer circumference 4a on the take-up drum 4 along the guide rail 61. The drawing passage unit 71 supports an underside of the bare coil wire 10 drawn from the take-up drum 4 by the drawing member 6.

A pair of plate-shaped guide members 711, 711 is disposed at an end portion 71a on a side near the take-up drum 4 of the drawing passage unit 71. The guide members 711, 711 are each curved gradually to approach the drawing passage unit 71 from the outer circumference 4a of the take-up drum 4. The guide members 711, 711 guide the bare coil wire 10 drawn from the take-up drum 4 by the drawing member 6 as sandwiched from both sides so that the bare coil wire 10 does not laterally spread. Mutually opposing surfaces of the guide members 711, 711 are smoothly curved to a degree at which they do not exceed an elastic range of the bare coil wire 10 so that no winding tendencies are applied to the bare coil wire 10 when guiding the bare coil wire 10.

Figure 11:
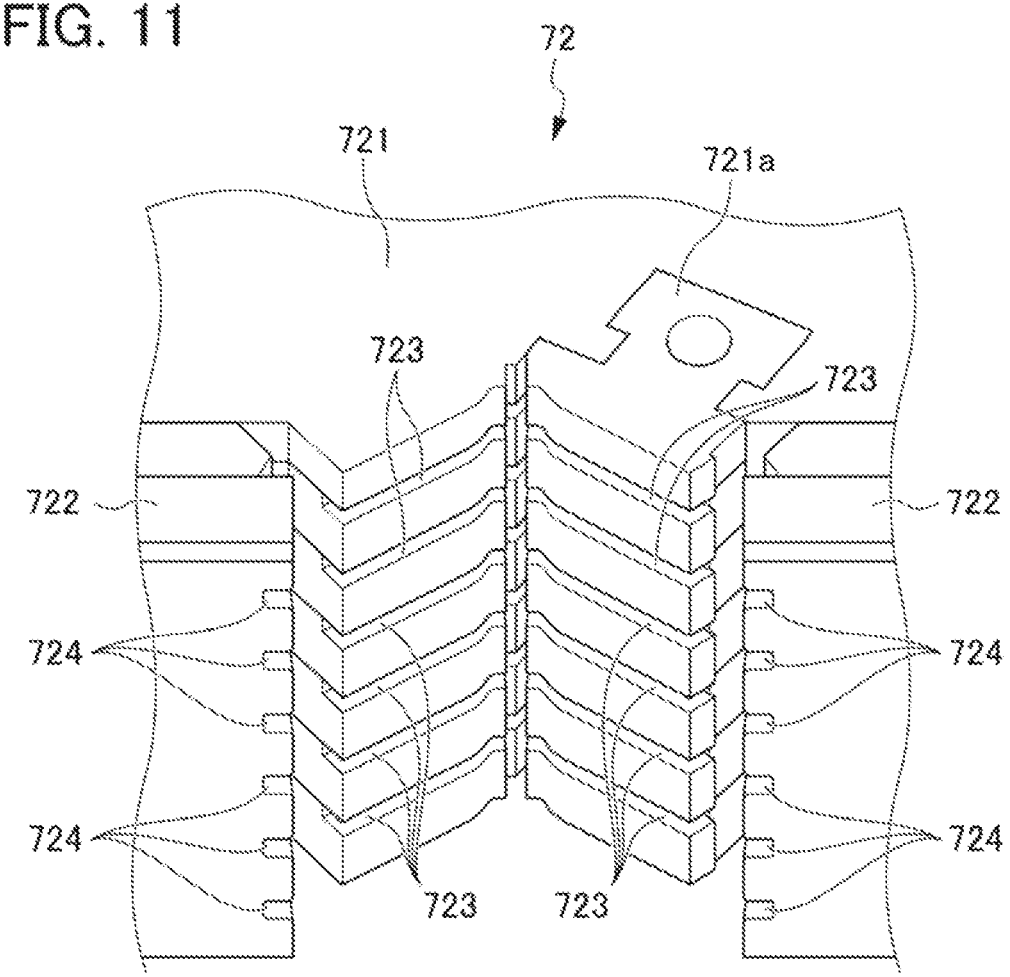
FIG. 11 is a perspective view of a die.

The die 72 is arranged at an end portion 71b at a far side from the take-up drum 4 of the drawing passage unit 71. This end portion 71b corresponds to an area near the end portion in the drawing direction of the bare coil wire 10 by the drawing member 6. The die 72 includes a convex bending die 721 that forms the apex 21 and the pair of oblique portions 22, 22 of the U-shaped coil 20, and a pair of shoulder bend die 722, 722 that forms a pair of shoulder portions 23, 23 on the U-shaped coil 20, as shown in FIG. 11. The convex bending die 721 includes a crank bending unit 721a for offsetting one oblique portion 22 by forming the apex 21 and one shoulder portion 23 on the U-shaped coil 20 into a crank shape. The crank bending unit 721a is composed of a portion that corresponds to one oblique portion 22 of the convex bending die 721. The crank bending unit 721a is disposed to movable downward relative to the convex bending die 721.

The convex bending die 721 and the shoulder bending die 722, 722 are all female and have six grooves 723, 724 each housing the bare coil wire 10 drawn by the drawing member 6 (a bundle of bare coil wire 11 described below). The male die 72 in the present embodiment is constituted by the drawing member 6. Accordingly, the die 72 forms the U-shaped coil 20 by the drawing member 6 that has drawn the bare coil wire 10 from the take-up drum 4 being mounted and clamped at the convex bending die 721 as male die and the shoulder bending die 722, 722.

A series of operations of the coil-forming apparatus 1 for forming a U-shaped coil 20 will now be described. After being straightened coming from the bobbin 2 via the straightening unit 3, the bare coil wire 10 is housed in the first housing unit 451 at the lowermost portion of the first outer circumferential member 45 and the second housing unit 462 at the lowermost portion of the second outer circumferential member 46 on the take-up drum 4 by being guided to the bare coil-wire guide member 49, and wound by rotation of the take-up drum 4. The bare coil-wire guide member 49 raises the first support roller 492 and the second support roller 493 by a fixed distance each time the take-up drum 4 rotates three times, and guides the bare coil wire 10 to be housed in the first housing unit 451 and the second housing unit 462 of one above.

Figure 12:
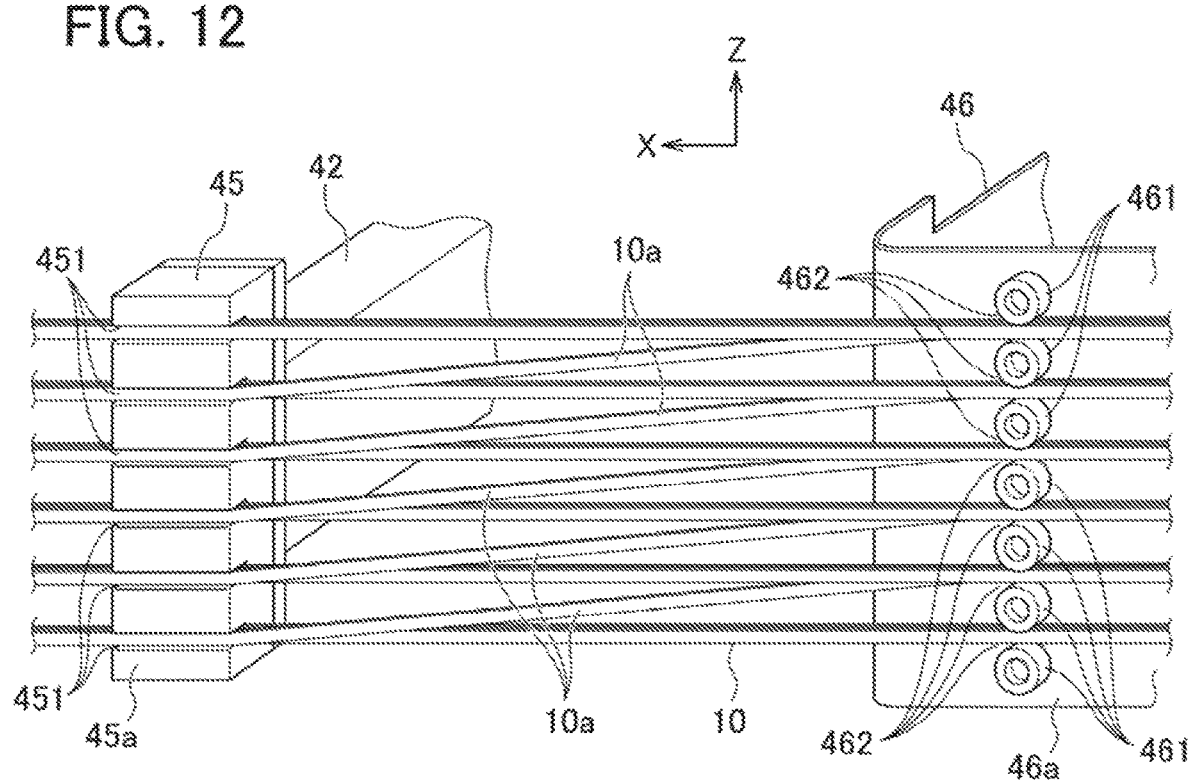
FIG. 12 is a front view of a portion of bare coil wire which has finished wrapping around an outer circumference of the take-up drum.

FIG. 12 shows a state in which the bare coil wire 10 is housed in all first housing units 451 and second housing units 462 by making eighteen winds around the take-up drum 4. The bare coil wire 10 wound eighteen times around the take-up drum 4 has five oblique portions 10a wound diagonally toward the first housing unit 451 and the second housing unit 462 on one above for every three winds around the take-up drum 4.

Figure 13:
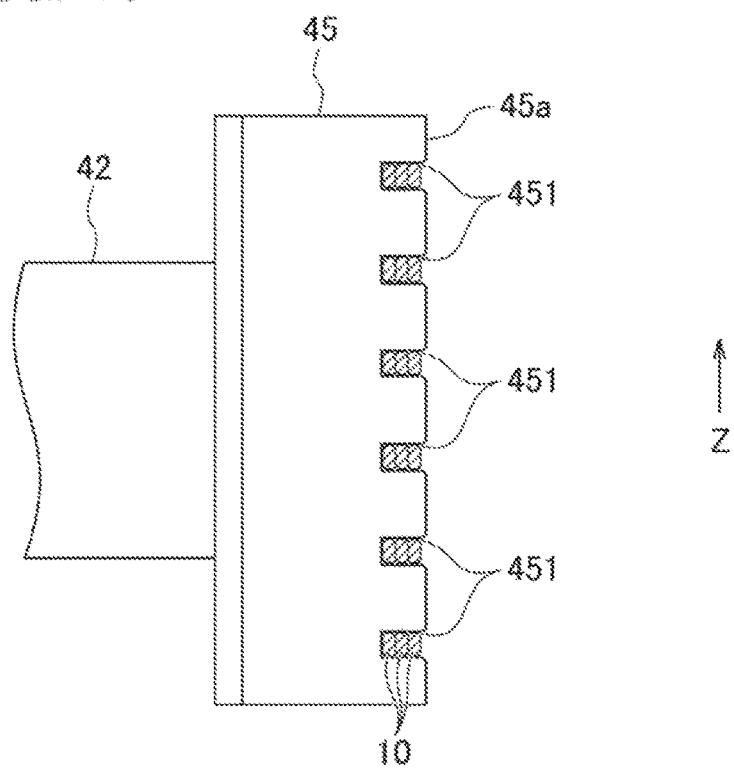
FIG. 13 is a side view of the first outer circumferential member housing bare coil wires in all of first housing units.

FIG. 13 shows a state in which the bare coil wire 10 wound eighteen times around the take-up drum 4 is housed in all of the first housing units 451 on the first outer circumferential member 45. Each first housing unit 451 houses three winds of the bare coil wire 10 around the take-up drum 4, layered in a radial direction of the take-up drum 4. Although not shown, the three winds of bare coil wire 10 around the take-up drum 4 are layered and housed in the same way on all the second housing units 462 of the second outer circumferential member 46.

As shown in FIG. 4, the take-up drum 4 has a receiving unit 51 on the cutting member 5 between any two adjacent first outer circumferential members 45, 45 of the twelve first outer circumferential members 45. The receiving unit 51 shown in the present embodiment is disposed between two, short, second outer circumferential members 46, 46 arranged between the first outer circumferential members 45, 45. After winding eighteen winds of the bare coil wire 10, the take-up drum 4 is stopped and positioned so that the position of this receiving unit 51 matches the position of the cutting member 5.

Figure 14:
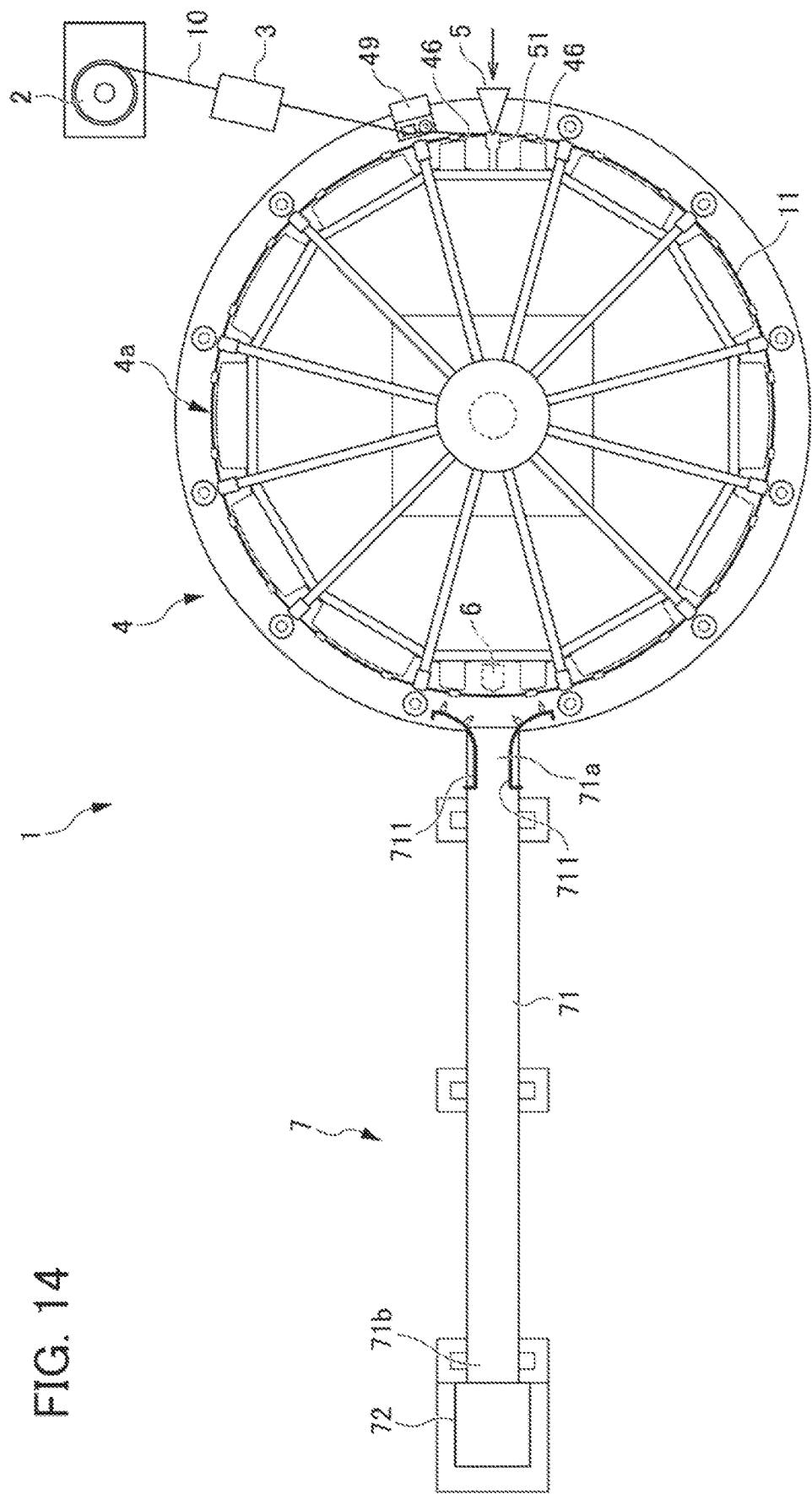
FIG. 14 is a plan view of a coil-forming apparatus showing an aspect of cutting a bare coil wire.

After the take-up drum 4 is stopped, as shown in FIG. 14, the cutting member 5 cuts eighteen circumferences of the bare coil wire 10 at a portion of the outer circumference 4a by moving toward the receiving unit 51. As a result, the eighteen winds of the bare coil wire 10 are divided into six bare coil-wire bundles 11 composed of three bare coil wires 10 housed in the first housing unit 451 and the second housing unit 462, respectively. The bare coil-wire bundles 11 are pressed from an outside by the plurality of holding rollers 48 arranged at the outer circumference 4a of the take-up drum 4, and therefore do not fall from the take-up drum 4.

Figure 15:
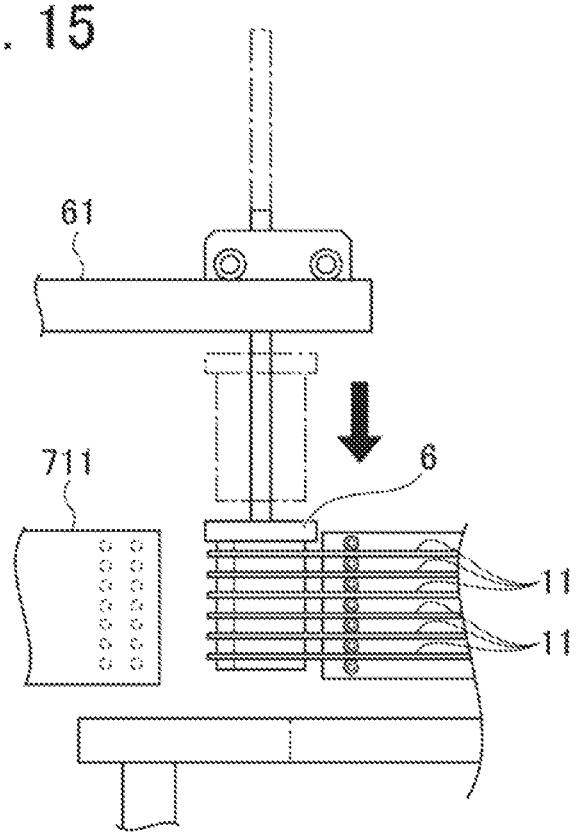
FIG. 15 is a view for explaining an aspect of arranging a drawing member at an inside of bare coil wire wrapped around the take-up drum.
Figure 16:
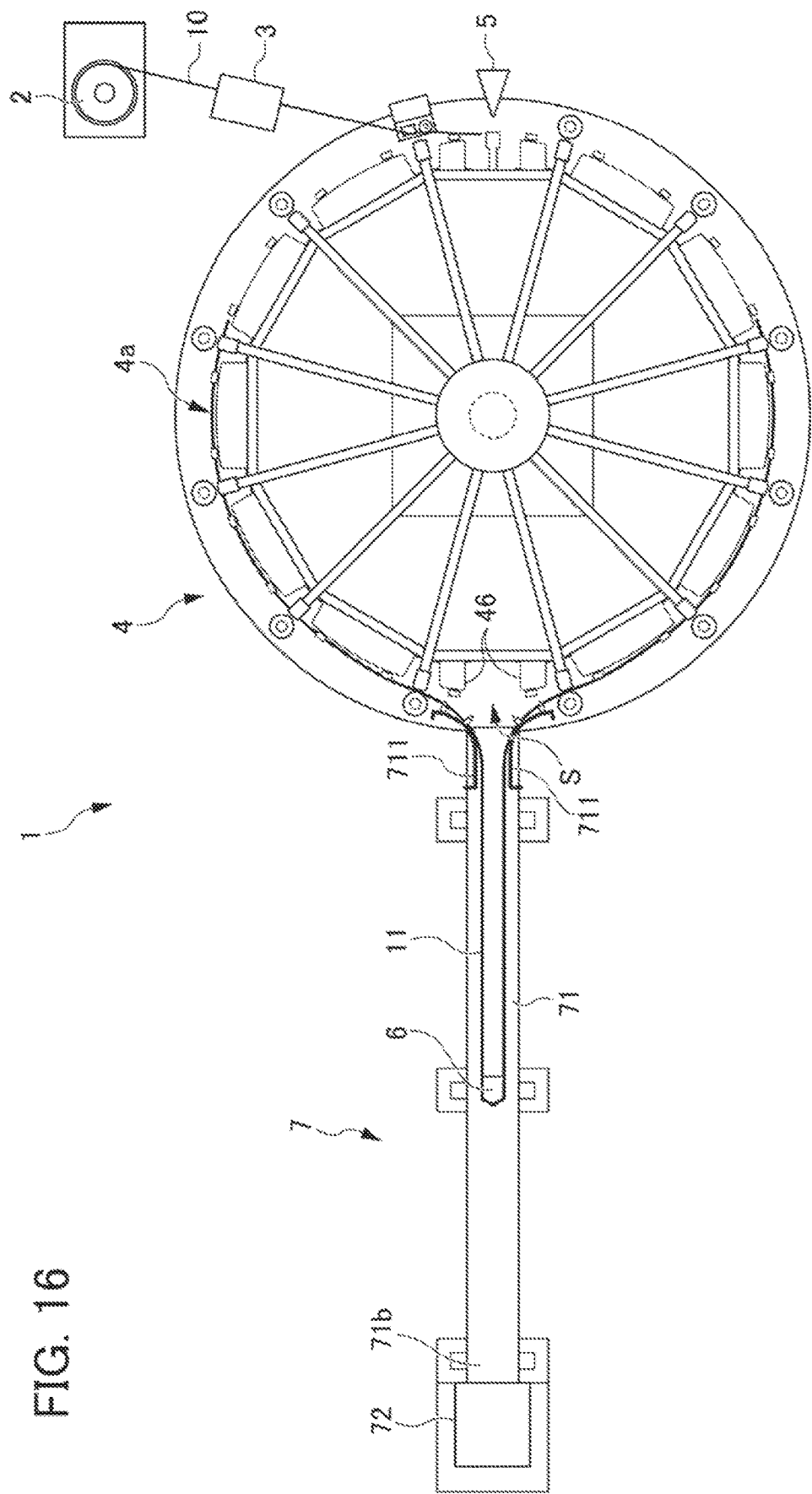
FIG. 16 is a plan view of a coil-forming apparatus, showing an aspect of the bare coil wire wrapped around the take-up drum being drawn by the drawing member.

After the bare coil wire 10 is cut, as shown in FIG. 15, the drawing member 6 is lowered and arranged at an inside of the bare coil-wire bundle 11. As shown in FIG. 16, at the take-up drum 4, on a side opposite to the cutting member 5, a housing space S at the drawing member 6 is formed at an inside of the bare coil-wire bundle 11. After being arranged in this housing space S, the drawing member 6 moves along the guide rail 61 and pulls out the six bare coil-wire bundles 11 on the outer circumference 4a of the take-up drum 4 in a radial direction outward of the take-up drum 4. At this time, the six bare coil-wire bundles 11 are arranged at regular intervals in a height direction of the drawing member 6.

The drawing member 6 pulls the coiled bare coil-wire bundle 11 to a side opposite to the cutting member 5 sandwiching the rotational axis 41 of the take-up drum 4, so the bare coil-wire bundle 11 has a length that is symmetrical left and right to the drawing member 6 as an apex. For that reason, the drawing member 6 can draw the bare coil-wire bundle 11 from the outer circumference 4a of the take-up drum 4 in a balanced and stable manner. The bare coil-wire bundle 11 drawn from the take-up drum 4 is supported from an underside by the drawing passage unit 71 in the forming unit 7.

Figure 17:
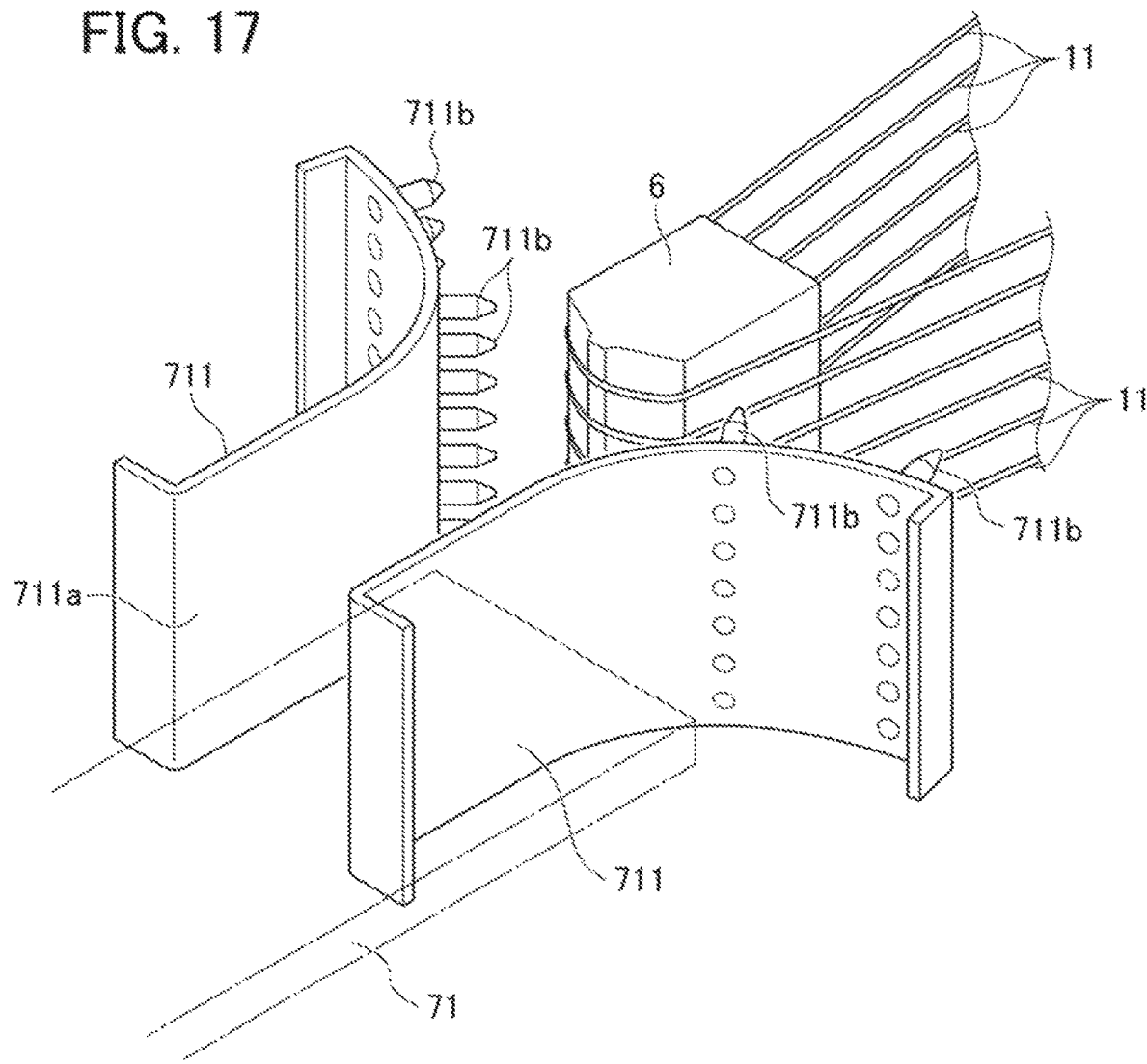
FIG. 17 is a perspective view showing an aspect of the drawing member passing between a pair of guide members.

As shown in FIG. 17, the drawing member 6 passes between the pair of guide members 711, 711 immediately upon drawing the bare coil-wire bundle 11. The spacing of the guide members 711, 711 gradually narrows along the direction of movement of the drawing member 6. As a result, the guide members 711, 711 form the six bare coil-wire bundles 11 into a generally U-shape along both faces of the drawing member 6, as the drawing member 6 passes therethrough.

A plurality of projections 711b, 711b are each disposed at opposing faces 711a, 711a of the guide members 711, 711. Seven projections 711b, 711b are equipped at regular intervals along the axial direction of the take-up drum 4 so that a bare coil-wire bundle 11 can pass between the projections 711b, 711b in adjacent and up and down directions. The six bare coil-wire bundles 11 pass between the projections 711b, 711b when drawn by the drawing member 6 and therefore do not become mutually entangled.

Figure 18:
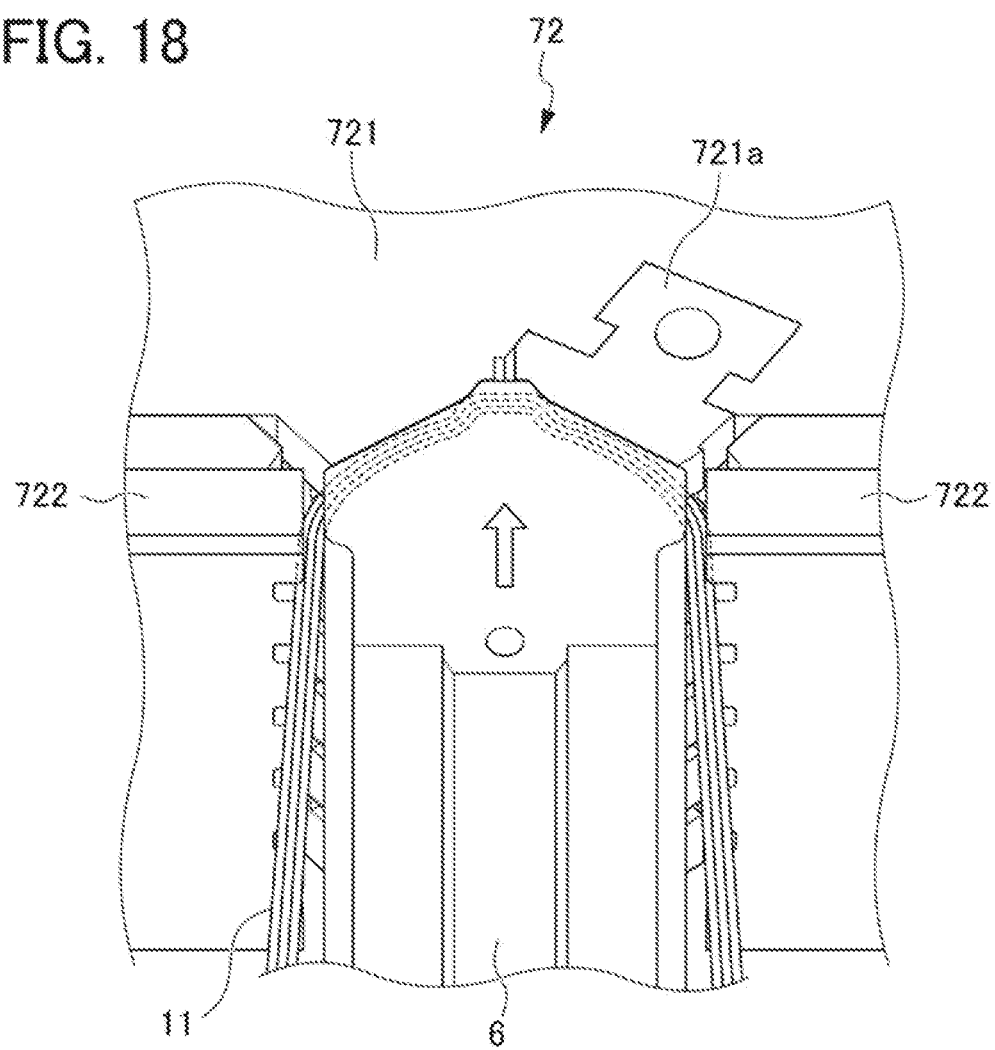
FIG. 18 is a perspective view showing an aspect of convex bending using the die.
Figure 19:
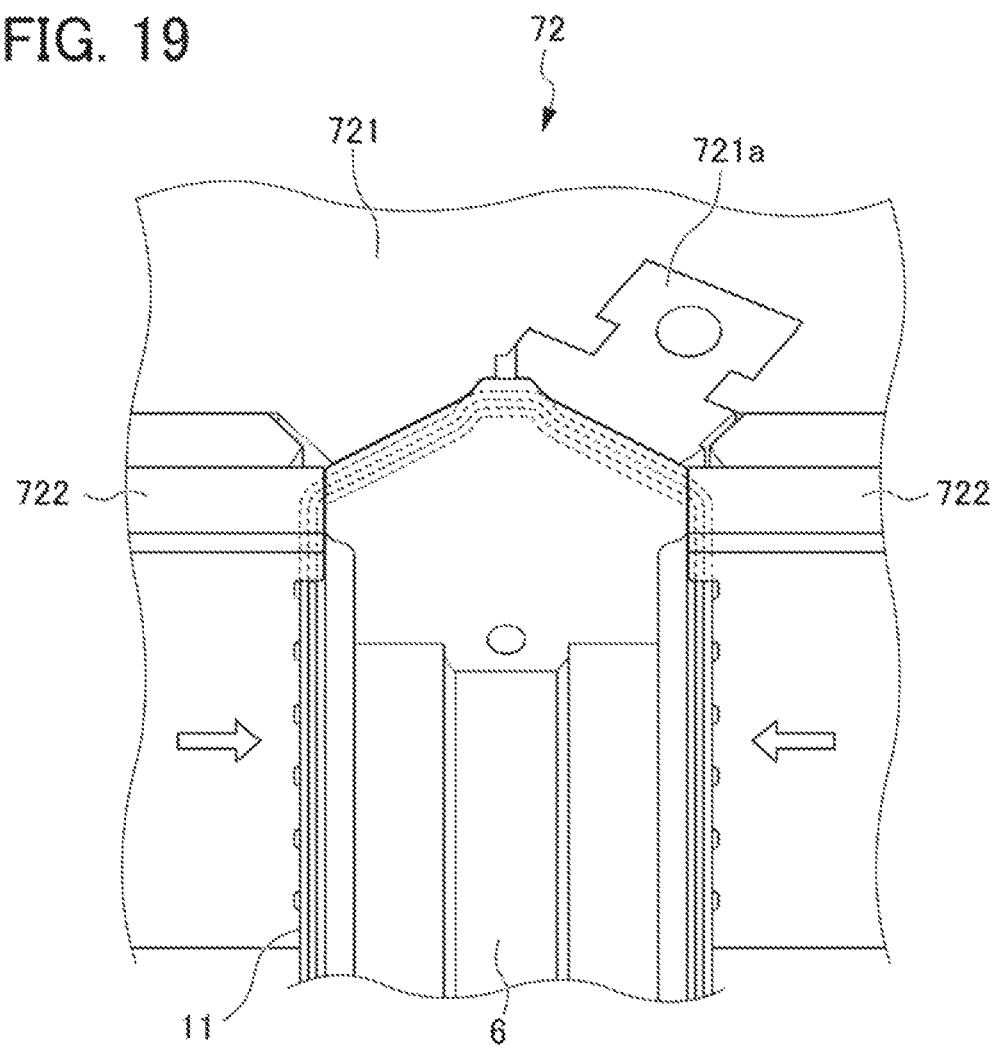
FIG. 19 is a perspective view showing an aspect of shoulder bending using the die.
Figure 20:
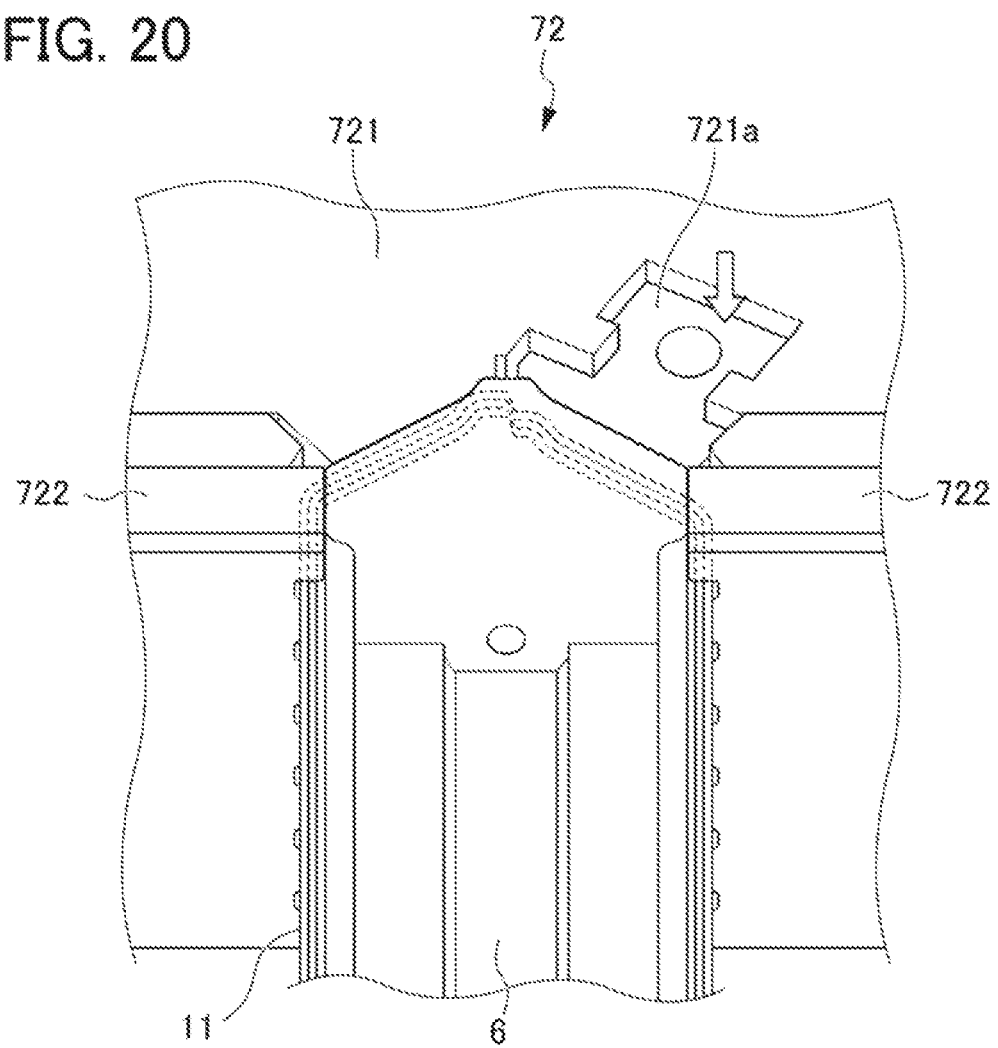
FIG. 20 is a perspective view showing an aspect of a crank bending using the die.

When the drawing member 6 moves to an end of the guide rail 61, the drawing member 6 strikes the convex bending die 721 on the die 72 of the forming unit 7, as shown in FIG. 18. Thereafter, the convex bending die 721, which is a female die, and the drawing member 6, which is a male die, are clamped, and the apex 21 and the pair of oblique portions 22, 22 are formed on each bare coil-wire bundle 11. Next, as shown in FIG. 19, a left and right pair of shoulder bending die 722, 722 are clamped and the pair of shoulder portions 23, 23 is formed on each bare coil-wire bundle 11. Thereafter, six U-shaped coils 20 with one offset oblique portion 22 are formed by the crank bending unit 721a moving downward with the convex bending die 721, the shoulder bending die 722, 722 and the drawing member 6 being clamped, as shown in FIG. 20. Six U-shaped coils 20 are removed from the coil-forming apparatus 1 after the die is opened.

Figure 21:
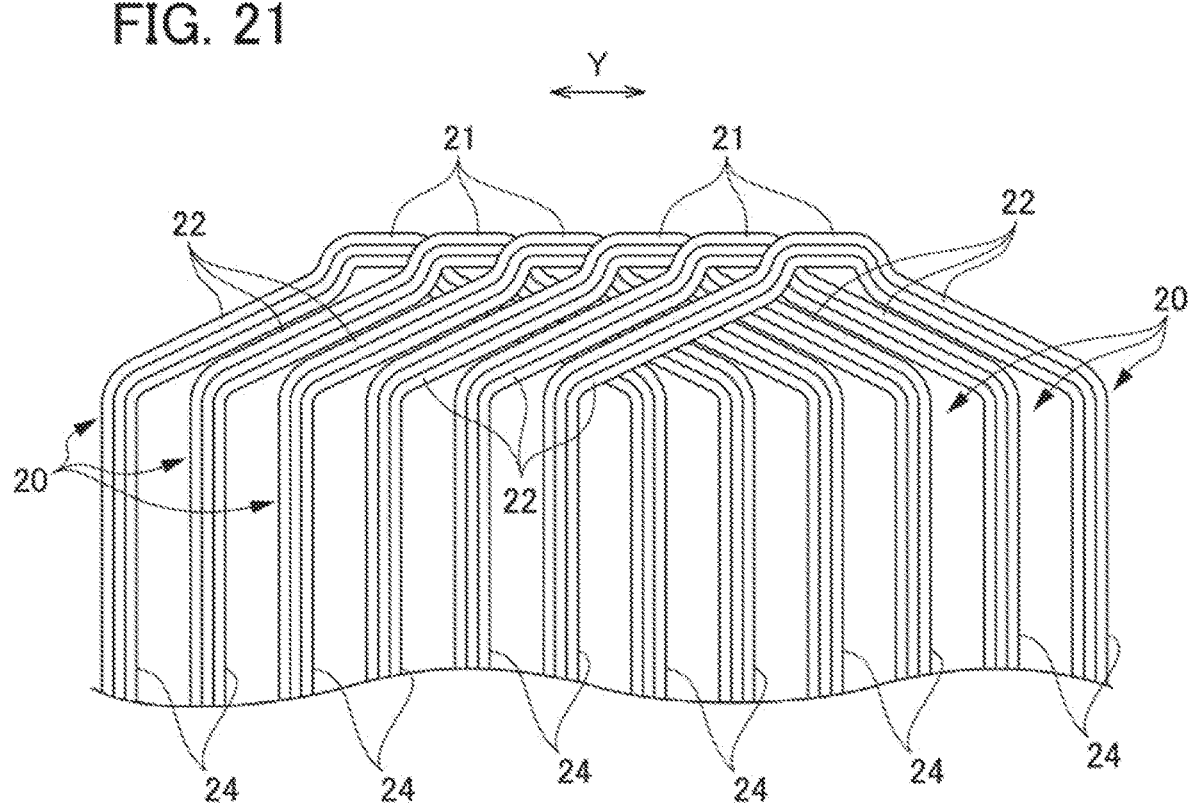
FIG. 21 is a front view showing a state, in which a plurality of U-shaped coils formed by the coil-forming apparatus are lined up.
Figure 22:
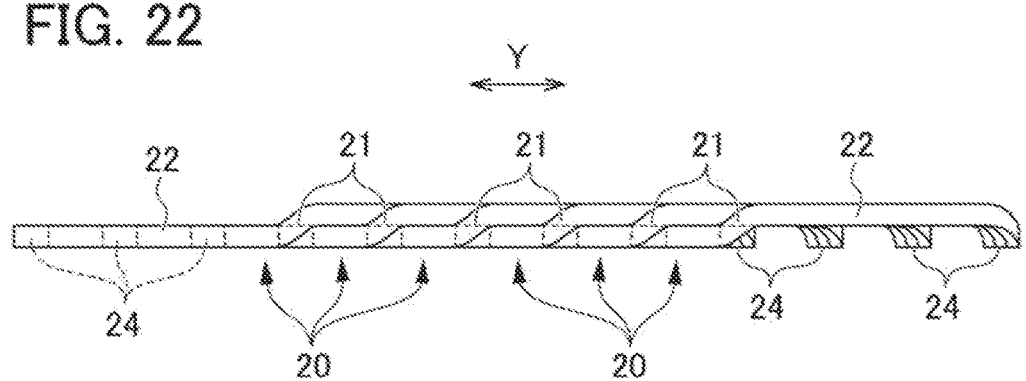
FIG. 22 is a plan view showing a state, in which a plurality of U-shaped coils formed by the coil-forming apparatus are lined up.

The six U-shaped coils 20 formed are offset in one oblique portion 22 by the thickness of the U-shaped coils 20 in the thickness direction, so that all twelve straight portions 24 are arranged on the same plane along the Y-direction when the straight portions 24 are offset from one another to be evenly spaced, as shown in FIGS. 21 and 22.

As described above, the coil-forming apparatus 1 according to the present embodiment comprises one bobbin 2 that winds and holds the bare coil wire 10, a take-up drum 4 that includes a plurality of first housing units 451 and second housing units 462 that house the bare coil wire 10 supplied from the one bobbin at a circumference 4a, a cutting member 5 that cuts the bare coil wire 10 housed in the first housing unit 451 and the second housing units 462 and wound around the take-up drum 4, at a portion of the circumference 4a of the take-up drum 4, a drawing member 6 that draws the bare coil wire 10 outward in a radial direction of the take-up drum 4 after being cut by the cutting member 5 from a position separated from the cutting member, and a forming unit 7 that forms the bare coil wire 10 drawn by the drawing member 6 into a U-shape. With this, the bare coil wire 10 is supplied from a single bobbin 2 and wound around the take-up drum 4 and can thus be formed into a U-shape without deterioration in forming precision caused by a winding tendency. Moreover, after winding and cutting the bare coil wire 10 at the outer circumference of the take-up drum 4, the bare coil wire 10 can easily be formed into a U-shape by simply pulling it out in the radial direction of the take-up drum 4.

The first housing unit 451 and the second housing unit 462 are disposed in a plurality in an axial direction of the take-up drum 4. With this, by winding the bare coil wire 10 across the plurality of first and second housing units 451, 462, the plurality of bare coil-wire bundles 11 can be formed after cutting, so that the plurality of coiled prime wires 10 can be formed into a U-shape together.

The first housing unit 451 and the second housing unit 462 have sizes capable of housing the bare coil wire 10 layered a plurality of winds around the take-up drum 4. According to this, a collective conductor consisting of the plurality of bare coil wires 10 can also be formed by simply winding the bare coil wires 10 around the outer circumference 4a of the take-up drum 4.

The forming unit 7 includes a drawing passage unit 71 that extends outward in a radial direction from the take-up drum 4 to constitute a passage for the bare coil-wire bundle 10 drawn by the drawing member 6, and the drawing passage unit 71 has a pair of guide members 711, 711 that guide the bare coil-wire bundle 11 drawn from the take-up drum 4 as sandwiched by the drawing member 6 from both sides so that the bare coil-wire bundle 11 does not spread. With this, when drawing the bare coil-wire bundle 11, the bare coil-wire bundle 11 can be smoothly drawn to the forming unit 7 without spreading from the outer circumference 4a of the take-up drum 4.

The drawing member 6 is composed to draw the bare coil-wire bundle 11 from the inside to the outside in the radial direction of the take-up drum 4 after being cut by the cutting member 5, and the forming unit 7 has a die 72 that forms the bare coil-wire bundle 11 into a U-shape near the end of the drawing direction by the drawing member 6, and the drawing member 6 constitutes a portion of the die 72. With this, the drawing member 6 for drawing the bare coil-wire bundle 11 from the outer circumference 4a of the take-up drum 4 can be used as-is to form the bare coil-wire bundle 11 into a U-shape with the die 72, and therefore, there is no need to transfer the bare coil-wire bundle 11 from the drawing unit 6, and it is possible to implement the process from drawing the bare coil-wire bundle 11 to forming of the bare coil-wire bundle 11 in one step.

The take-up drum 4 is constituted to wind the bare coil wire 10 around the outer circumferential 4a by rotating about the rotating shaft 41. With this, the bare coil wire 10 can easily be wound around the outer circumference 4a of the take-up drum 4 simply by rotating the take-up drum 4.

Note that it is acceptable for the take-up drum 4 in the coil-forming apparatus 1 to have only one housing unit that houses the bare coil wire 10 in the outer circumference 4a. That is, in such a case, the take-up drum 4 forms only one bare coil-wire bundle 11. It is acceptable that a plurality of housing units each house only one circumference of the bare coil wire 10.

In the coil forming apparatus 1 described in the above embodiment, the drawing member 6 constitutes a portion (male die) of the die 72 disposed inside the bare coil-wire bundle 11 to form the bare coil-wire bundle 11 into a U-shape, but the die disposed inside the bare coil-wire bundle 11 can also be constituted by a member separate to the drawing member 6.

EXPLANATION OF REFERENCE NUMERALS 1 coil-forming apparatus
2 bobbin (bare coil-wire holding unit)
4 take-up drum
4a outer circumference (of take-up drum)
41 rotating shaft
451 first housing unit
452 second housing unit
5 cutting member
6 drawing member
7 forming unit
71 drawing passage unit
711 guide member
72 die
10 bare coil wire

What is claimed is:

1. A coil-forming apparatus that forms bare coil wire into a U-shape, the coil-forming apparatus comprising:
   one bobbin that winds and holds the bare coil wire;
   a take-up drum including a rotating shaft, a plurality of frame units radially extending from the rotating shaft, and metal blocks respectively attached to leading ends of the plurality of frame units, the take-up drum being configured to wind the bare coil wire around an outer circumference thereof by rotating about the rotating shaft, the metal blocks including one or a plurality of grooves for housing the bare coil wire supplied from the one bobbin, the one or the plurality of grooves being formed on the outer circumference of the metal blocks and extending in a circumferential direction;
   a cutting member that cuts the bare coil wire housed in the one or the plurality of grooves and wound around the take-up drum, at a portion of the outer circumference of the take-up drum;
   a male die that has a convex shape toward an outside in a radial direction of the take-up drum, along an inner surface shape of a U-shape, wherein the male die is configured move along a guide rail, and to pull and move the bare coil wire in the radial direction after being cut by the cutting member, radially outward of the take-up drum from a position separated from the cutting member;
   a drawing passage that extends radially outward from the take-up drum and supports the bare coil wire drawn from the take-up drum by way of movement of the male die; and
   a female die that is arranged at an end portion at a far side from the take-up drum of the drawing passage, wherein when the male die moves along the drawing passage, the male die and the female die are clamped so that the bare coil wire is formed into a U-shape between the male die and the female die.

2. The coil-forming apparatus according to claim 1, wherein the plurality of the grooves are provided in an axial direction of the take-up drum.

3. The coil-forming apparatus according to claim 1, wherein each of the metal blocks has, along an axial direction of the take-up drum, a size capable of housing windings of the bare coil wire in the one or the plurality of grooves, the windings resulting from winding the bare coil wire around the take-up drum a plurality of times and being layered in the axial direction of the take-up drum.

4. The coil-forming apparatus according to claim 1, wherein
   the drawing passage unit includes a pair of guide members that sandwich both sides of the bare coil wire drawn from the take-up drum by the male die, for guiding the bare coil wire so that the bare coil wire does not spread.

5. The coil-forming apparatus according to claim 2, wherein each of the meal blocks has, along the axial direction of the take-up drum, a size capable of housing windings of the bare coil wire in the plurality of grooves, the windings resulting from winding the bare coil wire around the take-up drum a plurality of times and being layered in the axial direction of the take-up drum.

6. The coil-forming apparatus according to claim 2, wherein
the drawing passage unit includes a pair of guide members that sandwich both sides of the bare coil wire drawn from the take-up drum by the male die, for guiding the bare coil wire so that the bare coil wire does not spread.

7. The coil-forming apparatus according to claim 3, wherein
the drawing passage unit includes a pair of guide members that sandwich both sides of the bare coil wire drawn from the take-up drum by the male die, for guiding the bare coil wire so that the bare coil wire does not spread.

8. The coil-forming apparatus according to claim 2, wherein the male die is constituted to pull the bare coil wire after having been cut by the cutting member radially outward from an inside of the take-up drum; and
the female die forms the bare coil wire into the U-shape, near an end portion in a drawing direction by the male die.

9. The coil-forming apparatus according to claim 3, wherein the male die is constituted to pull the bare coil wire after having been cut by the cutting member radially outward from an inside of the take-up drum; and
the female die forms the bare coil wire into the U-shape, near an end portion in a drawing direction by the male die.

10. The coil-forming apparatus according to claim 4, wherein the male die is constituted to pull the bare coil wire after having been cut by the cutting member radially outward from an inside of the take-up drum;
the female die forms the bare coil wire into the U-shape, near an end portion in a drawing direction by the male die.

* * * * *